United States Patent [19]

Flaminio et al.

[11] Patent Number: 5,350,959
[45] Date of Patent: Sep. 27, 1994

[54] ELECTRICAL CONNECTOR FOR ALTERNATING CURRENT GENERATORS

[75] Inventors: Keith F. Flaminio, Fishers; Larry McReynolds, Muncie, both of Ind.

[73] Assignee: General Motors Corporation, Detroit, Mich.

[21] Appl. No.: 64,303

[22] Filed: May 20, 1993

[51] Int. Cl.⁵ .......................................... H02K 11/00
[52] U.S. Cl. .................................. 310/71; 310/68 D
[58] Field of Search .............. 310/68 D, 71; 257/925; 363/126; 174/54, 138 F, 266

[56] References Cited

U.S. PATENT DOCUMENTS 3,697,814 10/1972 Christman et al. ................ 307/100
4,780,619 10/1988 Campbell et al. .................... 307/10

Primary Examiner—Steven L. Stephan
Assistant Examiner—Clayton E. LaBalle
Attorney, Agent, or Firm—Creighton R. Meland

[57] ABSTRACT

An electrical connection for connecting the interior of an alternating current generator to the exterior of the generator. The generator has a three phase full-wave bridge rectifier that has three AC input terminal studs. The ends of three power supply conductors are connected to the terminal studs by terminals. The conductors extend from the terminal studs to the exterior of the generator and they extend through an opening formed in a side wall of the frame. The conductors are supported and guided by a conductor support part that is formed of plastic material. This conductor support part has a clamping block portion and a U-shaped conductor support portion. Portions of the conductors are disposed between a clamping block and the clamping block portion of the conductor support part. A plurality of threaded fasteners extend through aligned openings in the clamping block and in the block portion and are threaded into threaded bores formed in a lug portion of the end frame. When the fasteners are fully tightened, the conductors are tightly clamped between the clamping block and the block portion.

12 Claims, 2 Drawing Sheets

ELECTRICAL CONNECTOR FOR ALTERNATING CURRENT GENERATORS

This invention relates to an electrical connector for connecting the stator or output winding of a polyphase alternating current generator to an electrical load that is located externally of the generator.

In the use of alternating currents on motor vehicles, it is sometimes required to connect the stator or output winding of the generator to an electrical load that is located externally of the generator. The electrical load may be a windshield heater on a motor vehicle. A system for supplying electrical power to an electrically heated windshield from a polyphase stator winding of an alternating current generator is disclosed in the U.S. Pat. No. 4,780,619, to Campbell et al.

It is an object of this invention to provide a new and improved electrical connection for providing an electrical connection between the interior of an alternating current generator and the exterior thereof and where the electrical connection comprises conductors that are connected to the polyphase output winding of the generator. In carrying this object forward, three conductors or cables are electrically connected at one end thereof to the AC input terminals of a three phase full-wave bridge rectifier. The conductors extend through an opening formed in a side wall of the slip ring end frame of an alternating current generator. The conductors or cables are supported by a plastic conductor supporting and guide means that includes a part that has a U-shaped or channel shaped portion. This part also has a clamping block portion. Two of the conductors extend through the U-shaped portion and are retained by integral ribs that grip these two conductors. All three conductors extend through grooves or recesses formed on the clamping block portion and surfaces of these grooves engage one side of the conductors. Another clamping block part that is formed of plastic material is provided which has grooves or recesses that have surfaces that engage the opposite sides of the conductors. A pair of threaded screws extend through the clamping block portion and through the other clamping block. The screws are threaded into threaded bores formed in the slip ring end frame of the generator. When the screws are fully tightened, they secure the clamping block portion and the other clamping block to the end frame. Further, the conductors are tightly clamped between the clamping block portion and the other clamping block to provide for conductor strain relief.

IN THE DRAWINGS

Figure 1:
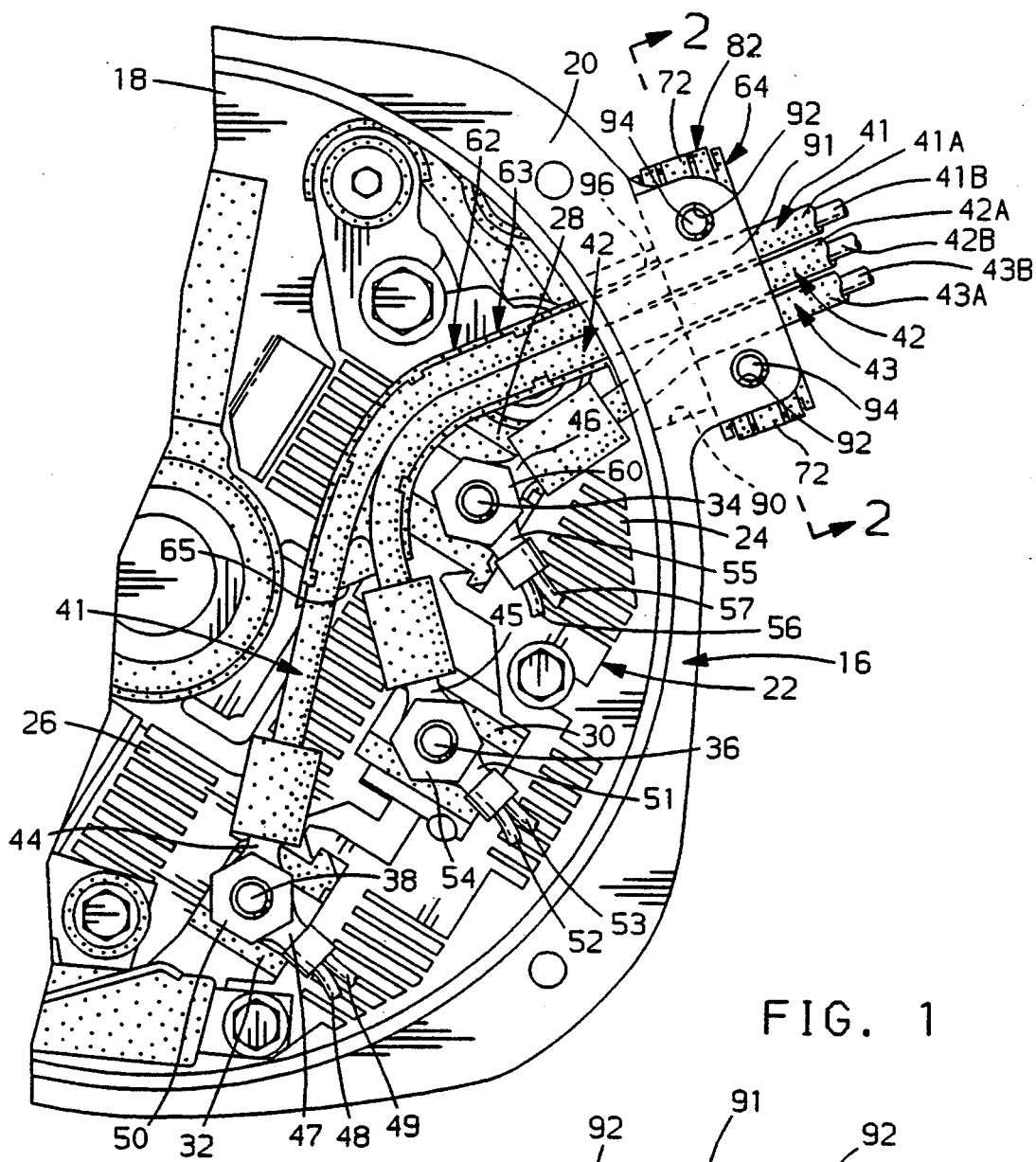
FIG. 1 is an end view, with parts broken, of the interior of the slip ring end frame of an alternating current generator.

Referring now to the drawings, FIG. 1 illustrates the interior of a slip ring end frame of an alternating current generator for automatic use. This alternating current generator has a drive end frame, a stator assembly that includes a stator output winding and a rotor, none of which have been illustrated but all of which are well known to those skilled in the art.

Figure 5:
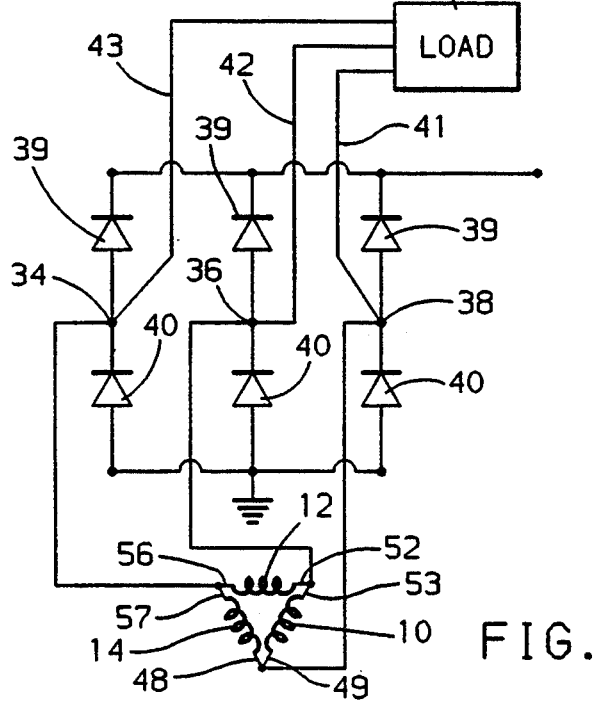
FIG. 5 is a schematic circuit diagram illustrating a load circuit connected to the AC input terminals of a bridge rectifier.

The stator output winding of the generator is shown in the schematic circuit diagram of FIG. 5. It is a three phase delta-connected winding comprised of phase windings 10, 12 and 14.

The slip ring end frame has been generally designated as 16 in FIG. 1. The end frame is formed of metal and has a radially extending end wall that has an inner surface 18. The end frame further has an axially extending side wall 20 that extends toward the viewer, as viewed in FIG. 1.

A bridge rectifier assembly that is generally designated as 22 is secured to and located in end frame 16. This bridge rectifier is comprised of metallic heat sinks 24 and 26 that are secured to an electrical insulator that has portions 28, 30 and 32. The insulator portions 28, 30 and 32 respectively, support threaded metallic terminal studs 34, 36 and 38 that form AC input terminals for the bridge rectifier. These terminals can be molded into the insulator portions 28, 30 and 32.

The bridge rectifier 22 has three positive diodes each designated as 39 in FIG. 5 and three negative diodes each designated as 40 in FIG. 5. The diodes 39 and 40 can be of the avalanche type.

The positive diodes 39 are supported by heat sink 26 and their cathodes are electrically connected to heat sink 26. The negative diodes 40 are supported by heat sink 24 and have their anodes electrically connected to heat sink 24. The diodes 39 and 40 have not been illustrated in FIG. 1. It is to be understood that these diodes can be supported by the respective heat sinks in a manner disclosed in the U.S. Pat. No. 3,697,814 to Christman et al., granted on Oct. 10, 1972, which is incorporated herein by reference. Further, the anodes of diodes 39 are connected respectively to terminal straps of the type disclosed in the above-referenced Christman et al. patent. These terminal straps have notched ends as disclosed in the Christman et al. patent, which are bent over the ends of insulator portions 28, 30 and 32 with a terminal stud positioned in a notch. The cathodes of diodes 40 are, likewise, connected to terminal straps that have notched ends that are bent over the respective ends of insulator portions 28, 30 and 32. The six terminal straps respectively connect the anodes of diodes 39 to respective terminal studs 34, 36, and 38 and respectively connect the cathodes of diodes 40 to respective terminal studs 34, 36 and 38.

The generator has three conductors or cables that connect the interior of end frame 16 to the exterior thereof. These conductors have been designated respectively as 41, 42 and 43. Conductor 41 has an outer insulator sheath 41A and an inner metallic wire conductor 41B. Conductors 42 and 43 have outer insulators 42A and 43A and inner metallic conductors 42B and 43B.

The inner wire conductor 41B is electrically connected to a metal eyelet type of terminal 44 that is assembled to terminal stud 38 with the stud projecting through the opening in the terminal. Inner wire conductor 42B is electrically connected to a metal eyelet type of terminal 45 and it is assembled to terminal stud 36. The inner wire conductor 43B is electrically connected to a metal eyelet type of terminal 46 and it is assembled to terminal stud 34.

The terminal stud 38 projects through the opening in a metal eyelet type of terminal 47. The terminal 47 is electrically connected to end wire portions 48 and 49 of two phase windings of the stator winding, as is shown in FIG. 5. The terminal 47 is located on top of terminal 44 and in engagement therewith. A nut 50 is screwed onto the threaded portion of stud 38 to retain the terminals 44 and 47 in place. When nut 50 is fully tightened, it forces the terminal 44 into tight engagement with one of the previously described notched terminal straps and forces terminal 47 into tight engagement with terminal 44.

Terminal stud 36 projects through the opening in a metal eyelet type of terminal 51. The terminal 51 is electrically connected to end wire portions 52 and 53 of two phase windings of the three phase output winding, as shown schematically in FIG. 5. Terminal 51 is located on top of terminal 45 and in engagement therewith. A nut 54 is threaded onto the threaded portion of terminal stud 36. The nut 54 performs the same function as nut 50.

The terminal stud 34 projects through the opening in a metal eyelet type of terminal 55. The terminal 55 is electrically connected to end wire portions 56 and 57 of two phase windings of the stator winding, as shown schematically in FIG. 5. The terminal 55 is located on top of terminal 46 and in engagement therewith. A nut 60 is threaded onto the threaded portion of terminal stud 34. The nut 60 performs the same function as nut 50.

Figure 3:
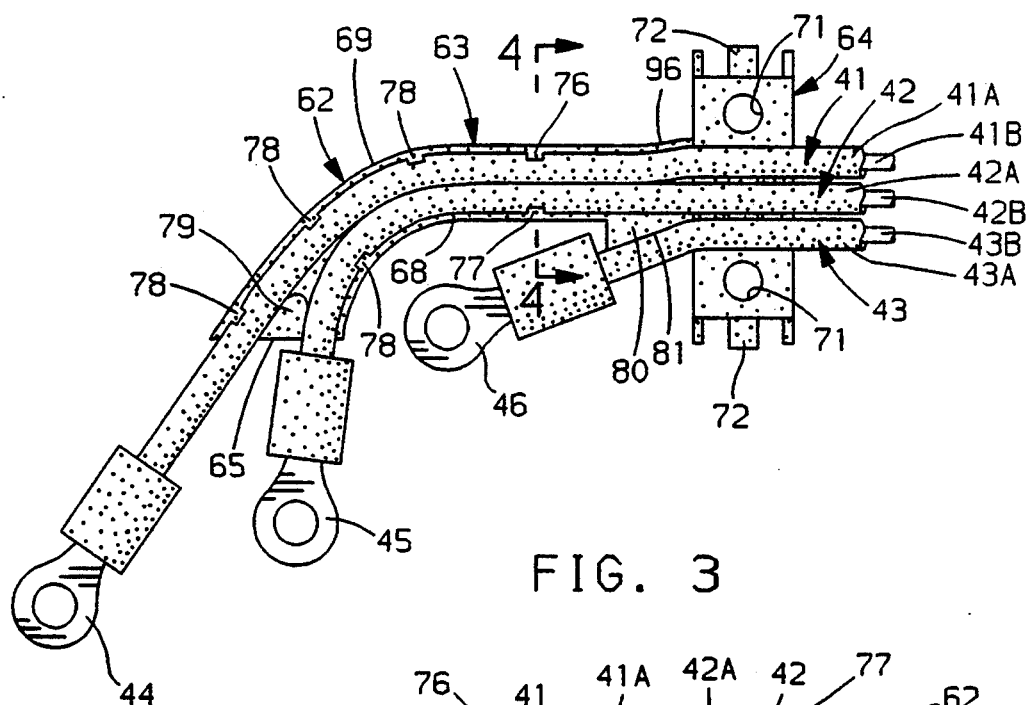
FIG. 3 is a plan view illustrating conductors supported by a retainer made in accordance with this invention.

The conductors or cables 41, 42 and 43 are supported, retained and guided by a support and retainer member that has been generally designated as 62. The part or member 62 is shown in FIG. 3 prior to assembly to the generator and is shown in FIG. 1 assembled to the generator end frame.

Figure 4:
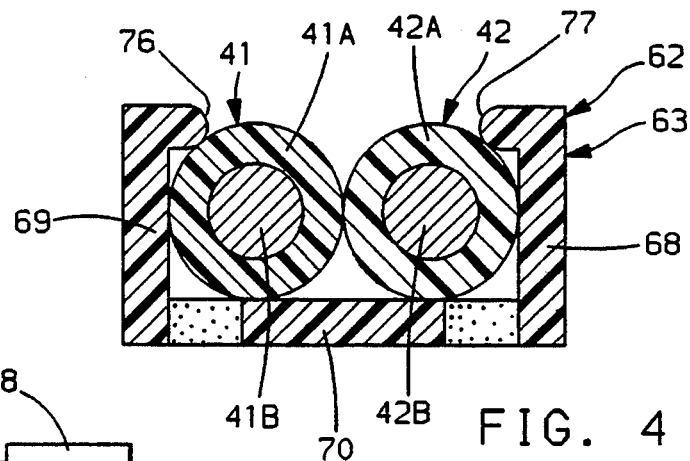
FIG. 4 is a sectional view taken along line 4—4 of FIG. 3.

The part 62 is formed of plastic material and is a one-piece molded part. The part 62 has a cable guide and retainer portion 63 and a support and clamping block portion 64. The portion 63 is U-shaped as shown in FIG. 4 and defines a channel that extends from block portion 64 to the open end of the channel designated as 65. The portion 63 is defined by opposed side walls 68 and 69 that are joined to a bottom wall 70. The channel shaped portion is not entirely straight throughout its entire length, but rather curves downwardly as viewed in FIG. 3 over a length of portion 63 located adjacent the open end 65.

The block portion 64 of part 62 has a pair of holes or openings 71 that extend therethrough. Portion 64 further has a pair of integral ribs 72 that cooperate with flexible latch arms on a clamping block part in a manner to be described hereinafter. Portion 64 also has three grooves or recesses 73, 74 and 75 that have bottom surfaces which are semicircular.

The manner in which the conductors 41, 42 and 43 are assembled to and retained by plastic part 62 will be described. Portions of conductors 41, 42 and 43 are pressed respectively into recesses or grooves 73, 74 and 75. The width of these grooves is so related to the diameter of the outer insulation sheath of a conductor that the insulating sheath is compressed between opposed walls that define a groove or, in other other words, is wedged therebetween. Consequently, there is a press-fit between the outer insulation of the conductors and the side walls of the grooves with the result that the conductor portions that extend through block portion 64 are secured to block portion 64.

The portion 63 of part 62 has a pair of opposed ribs 76 and 77 that extend inwardly from the upper ends of side walls 69 and 68. When conductors 41 and 42 are assembled to part 62, the side walls 69 and 68 deflect outwardly slightly to allow the conductors to be pushed in to a point where the conductors bottom-out on the upper surface of wall 70. The walls 69 and 68 now spring back toward each other with the result that the ribs 76 and 77 engage the conductors and the conductors are clamped between the ribs 76 and 77 and the upper surface of wall 70. Further, the conductors engage each other and accordingly are wedged between side walls 68 and 69.

The portion 63 of part 62 has four other ribs that are like ribs 76 and 77. The ribs have each been designated as 78. The ribs 78, like ribs 76 and 77, serve to retain the conductors in place.

The portion 63 of part 62 further has a triangular shaped rib 79 that extends from wall 70. A part of conductor 41 is wedged between a surface of rib 79 and an inner surface of wall 69 and is engaged by one of the ribs 78. A portion of conductor 42 is wedged between a surface of rib 79 and an inner surface of wall 68.

The portion 63 of part 62 has a portion 80 that has a slanted surface 81 that engages a portion of conductor 43.

When the conductors have been assembled to part 62 in a manner that has been described, a clamping block 82 is attached to block portion 64 of part 62. The clamping block 82 is formed of plastic material and is a one-piece molded part. The block 82 has three recesses or grooves each designated as 83. These recesses have semicircular inner surfaces. The block 82 has a pair of opposed flexible latch arms each designated as 84. Each latch arm has an opening 84A. Block 82 further has two openings or holes each designated as 85 that extend therethrough.

Figure 2:
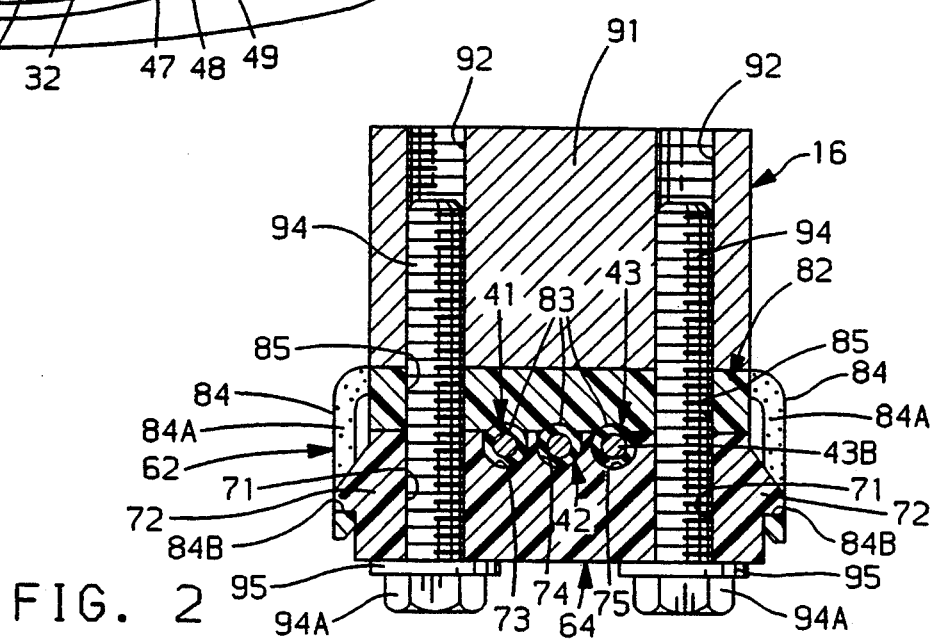
FIG. 2 is a sectional view taken along line 2—2 of FIG. 1.

In FIG. 2, the clamping block 82 is shown secured to block portion 64 of part 62. To attach block 82 to block portion 64, the block 82 is pushed onto portion 64. When this happens, the latch arms 84 are deflected outwardly and the ribs 72 move into the openings 84A in the latch arms. The latch arms now spring back toward each other and latch arm surfaces 84B now engage a surface on rib 72 to lock or secure block 82 to block portion 64. It can be seen from FIG. 2 that portions of conductors 41, 42 and 43 are located in the recesses in block 82 and in the recesses in block portion 64 and that these conductor portions are clamped between block 82 and block portion 64. It can further be seen from FIG. 2 that the holes 85 in block 82 are aligned respectively with the holes 71 in block portion 64.

The side wall of end frame 16 has a rectangular slot or opening 90 that extends radially entirely therethrough. The end frame 16 has a radially extending lug 91 that has a pair of threaded holes or bores each designated as 92.

When the conductors 41, 42 and 43 have been assembled to part 62 and block 82 has been secured to block portion 64, a wiring harness assembly has been developed which can now be assembled and secured to end frame 16. To assemble the wiring harness assembly to end frame 16, the portion 63 of part 62 is inserted into the interior of the end frame 16 through slot 90. The holes in block 82 and in block portion 64 are now aligned with the threaded holes or bores 92 in end frame 91. A pair of metallic threaded fasteners or screws, each designated as 94, are now pushed through the holes in block portion 64 and block 82 and are threaded into the threaded bores 92. The screws have heads 94A and they extend through washers 95. When screws 94 have been fully tightened, block portion 64 and block 82 are securely fastened to lug 91. The tightening of screws 94 further tends to tightly clamp conductors 41, 42 and 43 between block 82 and block portion 64 so that the conductors cannot move relative to block 82 and block portion 64. This provides a strain relief feature.

It can be appreciated that in the final assembly of the wiring harness to the end frame a length 96 of portion 63 of part 62 is located in slot 90. Further, portions of conductors 41, 42 and 43 are located in slot 90. Conductors 41, 42 and 43, of course, extend through slot 90.

When the wiring harness assembly has been secured to end frame 16 in a manner that has been described, the terminals 44, 45 and 46 can be assembled to terminal studs 38, 36 and 34. The portion 63 of part 62 is so shaped and dimensioned and conductors 41, 42 and 43 are so dimensioned and supported that when part 62 is attached to end frame 16, the terminals 44, 45 and 46 are located in such a position that they can be readily attached respectively to terminal studs 38, 36 and 34.

The conductors 41, 42 and 43 are adapted to feed three phase alternating current to an electrical load that is external of the generator. Such an electrical load is shown in FIG. 5 and designated as 98. This electrical load can be a windshield heater as described in the above-referenced patent to Campbell et al., U.S. Pat. No. 4,780,619.

The embodiments of the invention in which an exclusive property or privilege is claimed are defined as follows:

1. In combination, an alternating current generator having an end frame and a polyphase output winding, an opening in said end frame that extends entirely therethrough, a bridge rectifier having AC input terminals connected to said output winding, a plurality of electrical conductors extending from the interior of said end frame to the exterior thereof for feeding alternating current to an electrical load that is located outside of said generator, said conductors extending through said opening in said end frame, each said conductor having a terminal that is connected to a respective said AC input terminal of said bridge rectifier, a conductor support formed of plastic material secured to end frame, said conductor support extending from said opening in said end frame to said bridge rectifier and rib means on said conductor support engaging said electrical conductors to secure said conductors to said conductor support.

2. The combination according to claim 1 where said conductor support is U-shaped.

3. The combination according to claim 1 where said opening in said end frame is located in a side wall of said end frame.

4. The combination according to claim 1 where said polyphase output winding is a three phase winding and where said bridge rectifier is a three phase full-wave bridge rectifier.

5. In combination, an alternating current generator having an end frame and a three phase output winding, said end frame having a side wall, a radially extending opening in said side wall that extends entirely therethrough, a three phase full-wave bridge rectifier in said end frame having AC input terminals, means connecting said output winding to said AC input terminals of said bridge rectifier, a conductor support formed of plastic material having a block portion and a conductor support portion extending from said block portion, said block portion located outside of said side wall of said end frame, said conductor support portion extending from said block portion to said bridge rectifier, a portion of said conductor support portion located in said radially extending opening in said side wall, fastener means for securing said block portion to said end frame, first, second and third conductors extending from the interior of said end frame to the exterior thereof, each of said conductors having a portion thereof that extends through said radially extending opening in said side wall, each of said conductors being connected to a terminal that is secured to a respective AC input terminal of said bridge rectifier, said first and second conductors extending coextensively with said conductor support portion, and means on said conductor support portion engaging said first and second conductors for securing said first and second conductors to said conductor support portion.

6. The combination according to claim 5 where said conductor support portion is U-shaped.

7. The combination according to claim 5 where said block portion has an opening extending therethrough and where said fastener means comprises a threaded fastener that extends through said opening, said fastener threaded into a threaded bore formed in said end frame.

8. The combination according to claim 5 where said conductor support portion is U-shaped and is comprised of an end wall joined to a pair of opposed side walls, said side walls each having a rib that respectively engages said first and second conductors.

9. In combination, an alternating current generator having an end frame and a three phase output winding, said end frame having a side wall, a radially extending opening in said side wall that extends entirely therethrough, a three phase full-wave bridge rectifier in said end frame having AC input terminals, means connecting said output winding to said AC input terminals of said bridge rectifier, a conductor support formed of plastic material having a block portion and a conductor support portion extending from said block portion, said block portion located outside of said side wall of said end frame and having a plurality of openings extending therethrough, said conductor support portion extending from said block portion to said bridge rectifier, a portion of said conductor support portion located in said radially extending opening in said side wall, first, second and third conductors extending from the interior of said end frame to the exterior thereof, each of said conductors having a portion thereof that extends through said radially extending opening in said side wall, each of said conductors being connected to a terminal that is secured to a respective AC input terminal of said bridge rectifier, said first and second conductors extending coextensively with said conductor support portion, means on said conductor support portion engaging said first and second conductors for securing said first and second conductors to said conductor support portion, a clamping block formed of plastic material, said clamping block having a plurality of openings extending therethrough, said first, second and third conductors each having an axially extending portion located between said clamping block and said block portion of said conductor support, said openings in said block portion and in said clamping block being aligned with each other and with threaded bores formed in said end frame, and a threaded fastener extending through the openings in said clamping block and the openings in said block portion, said threaded fasteners being threaded into said threaded bores, said threaded fasteners causing axially extending portions of said conductors to be tightly clamped between said clamping block and said block portion.

10. The combination according to claim 9 where said clamping block has flexible latch arms for securing said clamping block to said block portion.

11. The combination according to claim 9 where said conductor support portion is U-shaped.

12. The combination according to claim 9 where said clamping block and said block portion have opposed aligned grooves and where portions of said conductors are located respectively in said grooves.

* * * * *